United States Patent
Ohashi et al.

(10) Patent No.: US 7,709,561 B2
(45) Date of Patent: *May 4, 2010

(54) RUBBER COMPOSITION FOR TREAD AND TIRE

(75) Inventors: Masayuki Ohashi, Kodaira (JP); Tadashi Shibata, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1176 days.

This patent is subject to a terminal disclaimer.

(21) Appl. No.: 10/534,500

(22) PCT Filed: Oct. 30, 2003

(86) PCT No.: PCT/JP03/13945

§ 371 (c)(1), (2), (4) Date: May 10, 2005

(87) PCT Pub. No.: WO2004/046239

PCT Pub. Date: Jun. 3, 2004

(65) Prior Publication Data

US 2006/0167163 A1    Jul. 27, 2006

(30) Foreign Application Priority Data

Nov. 15, 2002    (JP) ............................. 2002-332276

(51) Int. Cl.
*C08L 95/00* (2006.01)
*B60C 1/00* (2006.01)

(52) U.S. Cl. ................ 524/59; 524/474; 524/571; 152/905

(58) Field of Classification Search ................ 524/445, 524/474, 495, 59, 571; 525/333.1, 333.3
See application file for complete search history.

(56) References Cited

U.S. PATENT DOCUMENTS

| | | | |
|---|---|---|---|
| 4,360,049 A * | 11/1982 | Imai | 152/209.5 |
| 4,840,988 A * | 6/1989 | Nakayama et al. | 524/476 |
| 6,939,910 B2 * | 9/2005 | Nakagawa | 524/474 |
| 6,977,276 B2 * | 12/2005 | Henning et al. | 524/59 |
| 7,193,004 B2 * | 3/2007 | Weydert et al. | 524/424 |
| 2002/0045697 A1 * | 4/2002 | Sohnen et al. | 524/492 |
| 2002/0198296 A1 * | 12/2002 | Rawlinson et al. | 524/173 |

FOREIGN PATENT DOCUMENTS

| | | |
|---|---|---|
| EP | 0 939 104 A2 | 9/1999 |
| GB | 878004 A | 9/1961 |
| GB | 2 239 870 A | 7/1991 |
| JP | 11-302459 A | 11/1999 |
| JP | 2000-289407 A | 10/2000 |
| JP | 2003-268041 A | 9/2003 |

* cited by examiner

*Primary Examiner*—Vickey Nerangis
(74) *Attorney, Agent, or Firm*—Sughrue Mion, PLLC

(57) ABSTRACT

There is provided a rubber composition for a tread obtained by compounding (a) 5-40 parts by mass of a softening agent including an oil in which an extraction quantity with dimethylsulfoxide (DMSO) by IP346 process is controlled to less than 3% by mass and (b) 5-40 parts by mass of a liquid polymer having a viscosity average molecular weight of 45,000-100,000 based on 100 parts by mass of a rubber component, and considerably improving the fracture properties and wear resistance and controlling the lowering of the modulus of elasticity as compared with the case of compounding the conventional high aromatic oil.

18 Claims, No Drawings

RUBBER COMPOSITION FOR TREAD AND TIRE

TECHNICAL FIELD

This invention relates to a rubber composition for a tread and a tire, and more particularly to a rubber composition for a tread compounding a specified liquid rubber and an oil in which an extraction quantity with dimethylsulfoxide (DMSO) is less than 3% by mass, and a tire using the same.

BACKGROUND ART

Heretofore, a high aromatic oil (aromatic oil) has been favorably used as a softening agent for a rubber composition and an extender oil for a synthetic rubber in the rubber compositions for tires and other region from a viewpoint of provision of high loss characteristic (high hysteresis loss characteristic), affinity with rubber and the like.

Recently, it is started to use process oils in which extraction quantity with DMSO is less than 3% by mass, which are called as Treated Distilled Aromatic Extracts (T-DAE), Mild Extracted Solvates (MES) and the like obtained by treating the high aromatic oil made from petroleum as a starting material (e.g. see JP-A-11-302459, page 2).

However, rubber compositions using an alternate oil such as T-DAE, MES or the like are low in the fracture properties and wear resistance as compared with the case using the conventional high aromatic oil, and also the temperature dependence of viscoelastic characteristics in the rubber composition tends to shift toward a low temperature side because the softening point and viscosity of the rubber itself are low. Therefore, they have a problem of causing inconvenience that the wet skid property and steering stability of the tire lower. Also, it is considered to improve the fracture properties and the wear resistance by blending with an acrylonitrile-butadiene-styrene copolymer. In this case, however, there is a problem that the deterioration of low heat buildup becomes large if it is intended to control the lowering of modulus of elasticity.

DISCLOSURE OF THE INVENTION

Under the above situation, it is an object of the invention to provide a rubber composition for a tread considerably improving the fracture properties and wear resistance and controlling the lowering of modulus of elasticity without lowering the low heat buildup by using an oil having an extraction quantity with DMSO of less than 3% by mass as compared with the case of compounding the conventional high aromatic oil.

The inventors have made various studies for solving the above problems and found that it is effective to replace a part of the oil having the extraction quantity with DMSO of not more than 3% with a liquid polymer, and as a result, the invention has been accomplished.

That is, the invention provides a rubber composition for a tread characterized by compounding (a) 5-40 parts by mass of a softening agent including an oil in which an extraction quantity with dimethylsulfoxide (DMSO) by IP346 process is controlled to less than 3% by mass and (b) 5-40 parts by mass of a liquid polymer having a viscosity average molecular weight of 45,000-100,000 based on 100 parts by mass of a rubber component.

Further, the invention provides a tire using the above rubber composition.

BEST MODE FOR CARRYING OUT THE INVENTION

As the rubber component used in the invention may be any one of natural rubber and synthetic rubber. As the synthetic rubber are mentioned, for example, styrene-butadiene copolymer rubber (SBR), butadiene rubber (BR), isoprene rubber (IR), butyl rubber (IIR), acrylonitrile-butadiene copolymer rubber (NBR), ethylene-propylene rubber (EPM, EPDM) and a blend thereof. Among them, styrene-butadiene copolymer rubber produced by an emulsion polymerization method is preferable considering the balance of various performances in the tire tread.

In the rubber composition according to the invention, it is required that the softening agent (a) including the oil in which the extraction quantity with DMSO by IP346 process (PCA component (polycyclic aromatic compound)) is controlled to less than 3% by mass is compounded based on 100 parts by mass of the rubber component. As the oil having the extraction quantity with DMSO of less than 3% by mass are preferably used, for example, T-DAE (aforementioned), MES (aforementioned) and the like.

In the softening agent (a), it is preferable to compound a hydrogenated naphthenic oil. The hydrogenated naphthenic oil can be obtained by previously subjecting naphthenic oil to a hydrogenation purification through a hydrogenation purification technique under a high temperature and a high pressure. Also, the hydrogenated naphthenic oil is preferable to have a content of naphthenic hydro-carbon (% $C_N$) of not less than 30 as measured according to ASTM D2140 (i.e. through a ring analysis as a common name).

The hydrogenated naphthenic oil is preferable to be added in an amount of 20-70% by mass per the amount of the oil having the extraction quantity with DMSO of less than 3% by mass. Such a hydrogenated naphthenic oil is available as a commercial product such as SNH8, SNH46, SNH220, SNH440 (trade mark) and the like made by Sankyo Yuka Kogyo Co., Ltd.

Further, the softening agent (a) may contain asphalt. As the asphalt, it is preferable that an asphaltene component is not more than 5% by mass considering the affinity with the synthetic rubber used and the effect as the softening agent. Moreover, the asphaltene component is quantified from a composition analysis measured according to JPI process (Japan Petroleum Society process). Such an asphalt is particularly preferable to be naphthenic straight asphalt and also it is preferable that a dynamic viscosity at 120° C. is not more than 300 mm$^2$/sec.

The amount of asphalt compounded is preferable to be within a range of 95/5-5/95 as a mass ratio of hydrogenated naphthenic oil to asphalt. When the amount of asphalt exceeds 95% by mass, the affinity with the synthetic rubber used comes into problem and the effect may become small.

The mixing method of asphalt is not particularly limited. The asphalt may be previously mixed with the hydrogenated naphthenic oil, or a softening agent prepared by existing a main component of asphalt in the hydrogenated naphthenic oil at an adequate ratio at the purification stage of the conventional hydrogenated naphthenic oil may be used. From viewpoint of the easiness of the preparation of the softening agent and the economical reasons, however, it is preferable to adopt a preparation method wherein asphalt is dissolved in the hydrogenated naphthenic oil (including the extender oil and compounding oil).

In the rubber composition according to the invention, it is required that the softening agent (a) is compounded in an amount of 5 to 40 parts by mass based on 100 parts by mass of the rubber component as a total amount of ① oil having an extraction quantity with DMSO of less than 3% by mass, ② hydrogenated naphthenic oil and ③ asphalt. When the amount is outside the above range, it is difficult to obtain excellent performances such as fracture properties and wear resistance.

Then, in the rubber composition according to the invention, it is required to compound the liquid polymer (b) having a viscosity average molecular weight of 45,000-100,000 together with the softening agent (a). When the viscosity average molecular weight is less than 45,000, the fracture properties are poor, while when it exceeds 100,000, the hardness becomes high and the gripping property lowers. From this viewpoint, the viscosity average molecular weight is further preferable to be 55,000-85,000.

As a kind of the liquid polymer are mentioned, for example, a polydiene-based polymer such as liquid styrene-butadiene copolymer, liquid polybutadiene or the like; a polyolefinic polymer such as polyisobutylene or the like; and a modified polymer having a functional group such as OH group, COOH group or the like in the polymer. Among them, the liquid styrene-butadiene copolymer and its modified polymer are particularly preferable in a point that the effect of improving both the strength at break and the wear resistance is large.

The amount of the liquid polymer compounded in the invention is required to be a range of 5-40 parts by mass based on 100 parts by mass of the rubber component. Further, the compounding mass ratio to the softening agent is preferable to be a range of 5/95-95/5.

In the rubber composition according to the invention, carbon black, silica, aluminum hydroxide and the like may be used as a reinforcing filler. As the carbon black are mentioned, for example, FEF, SRF, HAF, ISAF, SAF and the like. Among them, HAF, ISAF and SAF having an excellent wear resistance are particularly preferable.

In addition to the above components, the rubber composition according to the invention may be properly compounded with various additives usually used in the rubber industry such as zinc white, stearic acid, silane coupling agent, vulcanization accelerator, antioxidant and the like.

The rubber composition according to the invention is excellent in the strength at break and wear resistance and can control the lowering of the modulus of elasticity as compared with the case using the usual aromatic oil. Therefore, such a rubber composition can be preferably used as a rubber composition for a tread of a tire.

Moreover, as a gas filled inside the tire can be used normal air or air having a changed oxygen partial pressure, and an inert gas such as nitrogen or the like.

The invention will be explained in detail with reference to examples and comparative examples, but the invention is not limited to these examples.

EXAMPLES (a) Fracture Properties

A test specimen is prepared from a vulcanized rubber sheet (150 mm×150 mm×2 mm) by using a knife of JIS No. 3 according to JIS K6301-1995. The strength at break of the test specimen is measured at 25° C. by means of a tensile testing machine and represented by an index. The larger the index value, the better the fracture properties.

(b) Modulus of Elasticity (E')

It is measured by using a spectrometer (made by Toyo Seiki Co., Ltd.) at room temperature under conditions of dynamic strain 1% and frequency 15 Hz. The larger the index value, the better the result.

(c) Wear Resistance

A worn amount at a slippage ratio of 60% is measured by a Lambourn type abrasion testing machine and a reciprocal thereof is represented by an index. The larger the index value, the better the result.

Examples 1-3, Comparative Example 1, 2

A rubber composition is prepared by compounding 50 parts by mass in total of various softening agents and liquid polymer based on 100 parts by mass of a rubber component consisting of emulsion-polymerized SBR and BR and milling with various additives according to a compounding recipe shown in Table 1 and then the fracture properties, modulus of elasticity (E') and wear resistance of a vulcanized rubber made from the rubber composition are measured. The measured results are shown in Table 1.

Table 1

TABLE 1

| Compounding recipe (part by mass) | Comparative Example 1 | Comparative Example 2 | Example 1 | Example 2 | Example 3 |
|---|---|---|---|---|---|
| SBR *[1] | 75 | 75 | 75 | 75 | 75 |
| BR (BR01) *[2] | 25 | 25 | 25 | 25 | 25 |
| Carbon black (N234) | 80 | 80 | 80 | 80 | 80 |
| Oil A (T-DAE) *[3] | 0 | 37.5 | 9 | 18.5 | 28 |
| Oil B *[4] | 0 | 12.5 | 13 | 13 | 13 |
| Aromatic oil | 50 | 0 | 0 | 0 | 0 |
| Liquid polymer *[5] | 0 | 0 | 28 | 18.5 | 9 |
| Stearic acid | 1 | 1 | 1 | 1 | 1 |
| Wax | 1 | 1 | 1 | 1 | 1 |
| Antioxidant 6C *[6] | 1 | 1 | 1 | 1 | 1 |
| Zinc oxide | 3 | 3 | 3 | 3 | 3 |
| Vulcanization accelerator DPG *[7] | 0.5 | 0.5 | 0.5 | 0.5 | 0.5 |
| Vulcanization accelerator NS *[8] | 0.5 | 0.5 | 0.5 | 0.5 | 0.5 |
| Vulcanization accelerator DM *[9] | 0.5 | 0.5 | 0.5 | 0.5 | 0.5 |
| Sulfur | 1.5 | 1.5 | 1.5 | 1.5 | 1.5 |

TABLE 1-continued

| Compounding recipe (part by mass) | Comparative Example 1 | Comparative Example 2 | Example 1 | Example 2 | Example 3 |
|---|---|---|---|---|---|
| Tensile strength (index) | 100 | 98 | 120 | 116 | 108 |
| Wear resistance (index) | 100 | 96 | 117 | 113 | 105 |
| Modulus of elasticity (index) | 100 | 73 | 94 | 86 | 82 |

(Note)
*[1] SBR; emulsion-polymerized SBR having a bound styrene content of 40%
*[2] BR01: "trade mark" (made by JSR Corporation, cis-1,4-polybutadiene)
*[3] Oil A (T-DAE): (Treated Distilled Aromatic Extracts, process oil having an extraction quantity with DMSO of less than 3% by mass)
*[4] Oil B: a blend of hydrogenated naphthenic oil (made by Sankyo Yuka Kogyo Co., Ltd. % $C_N$ = 43.0) and asphalt (asphaltene content: not more than 5%, dynamic viscosity at 120° C. = 250 mm$^2$/sec) at a mass ratio of 50/50
*[5] Liquid polymer: styrene-butadiene copolymer having a viscosity average molecular weight of 85,000
*[6] Antioxidant 6C: N-phenyl-N'-1,3-dimethylbutyl-p-phenylene diamine
*[7] Vulcanization accelerator DPG: diphenyl guanidine
*[8] Vulcanization accelerator NS: N-t-butyl-2-benzothiazyl sulfenamide
*[9] Vulcanization accelerator DM: dibenzothiazyl sulfenamide As seen from the above results, the compositions of Examples 1-3 of the invention considerably improve the tensile strength and wear resistance and control the lowering of the modulus of elasticity as compared with Comparative Examples 1 and 2. Particularly, remarkable effects are recognized in Example 1 wherein a compounding mass ratio of liquid polymer to softening agent (total amount of oil A and oil B) is within a range of 5/95-95/5.

INDUSTRIAL APPLICABILITY

As mentioned above, according to the invention, the oil having an extraction quantity with DMSO of less than 3% by mass and the specified liquid polymer are compounded with the rubber composition, whereby there can be provided a rubber composition for a tread considerably improving the tensile strength and wear resistance and controlling the lowering of modulus of elasticity as compared with the conventional rubber composition using the aromatic oil and a tire using the same.

The invention claimed is:

1. A rubber composition for a tread characterized by compounding (a) 5-40 parts by mass of a softening agent including an oil in which an extraction quantity with dimethylsulfoxide (DMSO) by IP346 process is controlled to less than 3% by mass and (b) 5-40 parts by mass of a liquid polymer having a viscosity average molecular weight of 45,000-100,000 based on 100 parts by mass of a rubber component,
wherein the softening agent (a) further contains a hydrogenated naphthenic oil and asphalt wherein the asphalt contains an asphaltene component not more than 5% by mass of the asphalt.

2. A rubber composition for a tread according to claim 1, wherein the viscosity average molecular weight of the liquid polymer is 55,000-85,000.

3. A rubber composition for a tread according to claim 2, wherein the liquid polymer is a liquid styrene-butadiene copolymer.

4. A rubber composition for a tread according to claim 1, wherein the liquid polymer is a liquid styrene-butadiene copolymer.

5. A rubber composition for a tread according to claim 1, wherein the hydrogenated naphthenic oil is obtained by hydrogenating a naphthenic oil in which a content of naphthenic hydrocarbon (% CN) measured according to ASTM D2140 is not less than 30.

6. A rubber composition for a tread according to claim 5, wherein the asphalt has a dynamic viscosity at 120° C. of not more than 300 mm$^2$/sec and a mass ratio of hydrogenated naphthenic oil/asphalt is 95/5-5/95.

7. A rubber composition for a tread according to claim 1, wherein the asphalt has a dynamic viscosity at 120° C. of not more than 300 mm$^2$/sec and a mass ratio of hydrogenated naphthenic oil/asphalt is 95/5-5/95.

8. A rubber composition for a tread characterized by compounding (a) 5-40 parts by mass of a softening agent including an oil in which an extraction quantity with dimethylsulfoxide (DMSO) by IP346 process is controlled to less than 3% by mass and (b) 5-40 parts by mass of a liquid polymer having a viscosity average molecular weight of 45,000-100,000 based on 100 parts by mass of a rubber component,
wherein the softening agent (a) further contains a hydrogenated naphthenic oil and asphalt wherein the asphalt contains an asphaltene component not more than 5% by mass of the asphalt, and
the oil is at least one process oil selected from the group consisting of T-DAE and MES.

9. A rubber composition for a tread according to claim 8, wherein the rubber composition contains not less than 13 parts by mass of hydrogenated naphthenic oil and asphalt based on 100 parts by mass of a rubber component.

10. A tire characterized by using a rubber composition as claimed in claim 1 in a tread.

11. A tire characterized by using a rubber composition as claimed in claim 2 in a tread.

12. A tire characterized by using a rubber composition as claimed in claim 3 in a tread.

13. A tire characterized by using a rubber composition as claimed in claim 4 in a tread.

14. A tire characterized by using a rubber composition as claimed in claim 5 in a tread.

15. A tire characterized by using a rubber composition as claimed in claim 6 in a tread.

16. A tire characterized by using a rubber composition as claimed in claim 7 in a tread.

17. A tire characterized by using a rubber composition as claimed in claim 8 in a tread.

18. A tire characterized by using a rubber composition as claimed in claim 9 in a tread.

* * * * *